Figure 3:
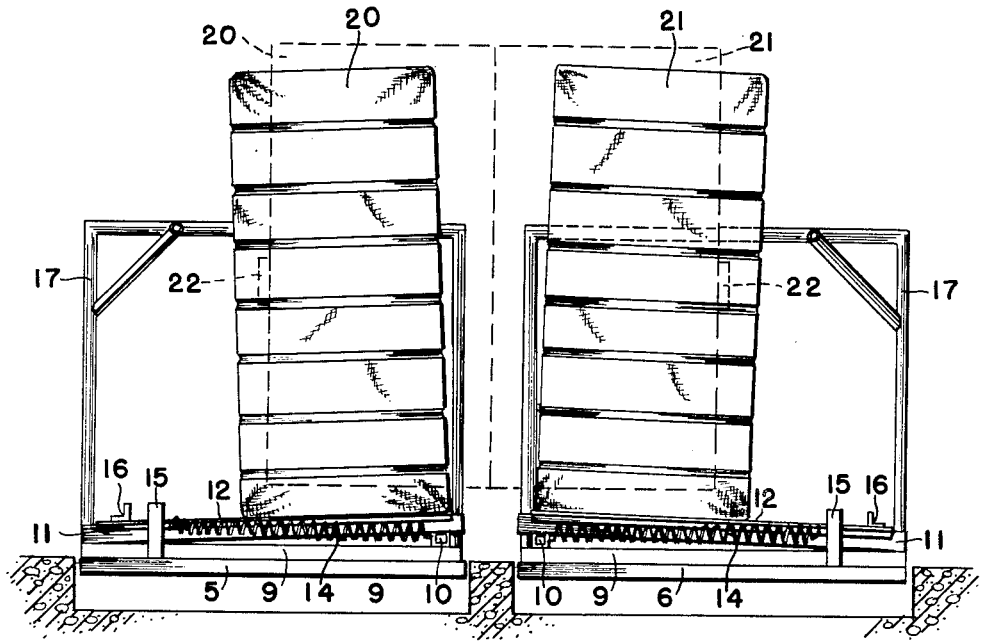

Jan. 15, 1957     L. E. DOHOGNE     2,777,682
MULTIPLE LOAD WEIGHING ASSEMBLY
Filed May 21, 1954     2 Sheets-Sheet 1
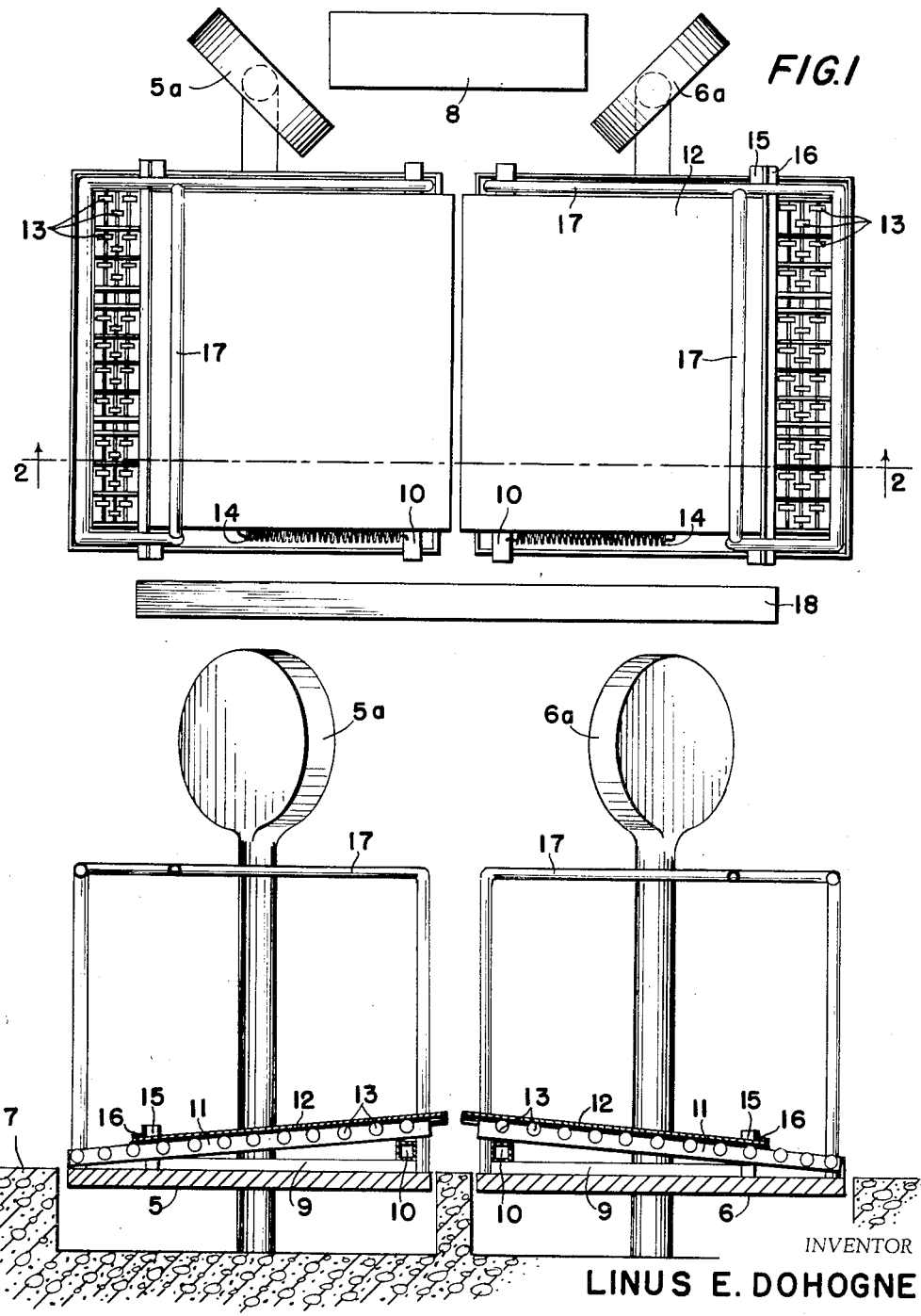
INVENTOR
LINUS E. DOHOGNE
BY
ATTORNEY Jan. 15, 1957   L. E. DOHOGNE   2,777,682
MULTIPLE LOAD WEIGHING ASSEMBLY
Filed May 21, 1954   2 Sheets-Sheet 2

INVENTOR
LINUS E. DOHOGNE
BY
ATTORNEY

United States Patent Office 2,777,682
Patented Jan. 15, 1957

2,777,682

MULTIPLE LOAD WEIGHING ASSEMBLY

Linus E. Dohogne, Paragould, Ark., assignor to National Cotton Compress and Cotton Warehouse Association, Memphis, Tenn.

Application May 21, 1954, Serial No. 431,410

5 Claims. (Cl. 265—71)

This invention relates to multiple-unit scales for separately weighing a plurality of simultaneously presented loads. More particularly, the invention consists in new and useful improvements in a dual scale assembly comprising two individual scale platforms respectively arranged to receive separate bales of cotton or the like, simultaneously deposited thereon by a lift truck or other load transporting device.

In the handling of cotton bales in warehouses, the most economical method of transporting the bales from place to place, is by means of lift trucks of the type equipped with two horizontally contractible arms usually actuated by a hydraulic cylinder and adapted to engage therebetween, one or more bales of cotton which are picked up and transported from one operation to another. As these clamps are generally made large enough to simultaneously grip two bales of cotton, it greatly facilitates the procedure in the weighing operation, to deliver two bales to the scales at one time.

However with presently available equipment, each cotton bale must be weighed separately, and when two bales are transported they must be set down near the scales to be put on the scale platform one at a time. This necessitates a double handling of the bales which usually requires four or more men with hand trucks. The bales are picked up one at a time and set on the scale platform while the trucker waits for the weight to be recorded, after which it is removed to a point on the other side of the scale to be picked up again two at a time for transporting to the next operation.

It is the primary object of this invention to provide a dual assembly having two adjacent platforms, whereby the operator of the lift truck in one operation, deposits two bales directly on the platforms where each bale is separately weighed.

Another object of the invention is to provide in an assembly of this character, two separate scale platforms respectively connected to individual dials, the latter being arranged side by side and set at a 45 degree angle with respect to one another, so as to be conveniently read from a common point between them.

Still another object of the invention is to provide means whereby the scale platforms will slide laterally a predetermined distance in opposite directions, when loads are deposited thereon, so as to avoid contact between the two loads and to insure the independent weighing of respective loads, means being provided to return the platforms to normal position when the loads are removed.

With the above and other objects in view which will appear as the description proceeds, the invention consists in the novel features herein set forth, illustrated in the accompanying drawings and more particularly pointed out in the appended claims.

Referring to the drawings in which numerals of like character designate similar parts throughout the several views, Figure 1 is a top plan view of my improved dual scale assembly.

Figure 2 is a transverse sectional view taken on line 2—2 of Figure 1.

Figure 4:
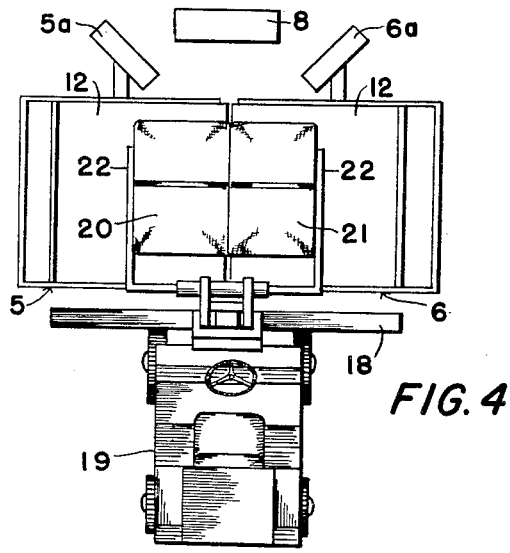

Figure 3 is a view generally similar to Figure 2, showing the positions of the bales and platforms when the bales are first presented to the scales (in dotted lines) and after being released from the lift truck and deposited on respective platforms (in full lines), and, Figure 4 is a more or less diagrammatic plan view, showing a conventional lift truck about to deposit two bales on the scale platforms.

In the drawings, 5 and 6 represent a pair of standard platform scales, set side by side in recesses in the floor or foundation 7, approximately six inches apart. The scales are operatively connected to dials 5a and 6a, respectively, which are preferably arranged at a 45 degree angle with respect to one another as best seen in Figure 1, so as to be conveniently readable from a weigher's table 8, located between them.

A rectangular angle iron frame 9 is welded on the top of each scale platform to support the shiftable load receiving superstructures carried by each platform. As shown in Figure 2, transversely extending box channels 10 are welded across adjacent edges of each frame 9 to elevate the corresponding ends of roller conveyor sections mounted on respective platforms. Each conveyor section consists of a pair of transversely spaced angle irons 11, the adjacent inner ends of opposite pairs being supported in elevated position on the box channels 10, so as to provide oppositely inclined superstructures as shown.

On each superstructure, between the vertical legs of the respective pairs of angle irons 11, a flat sheet metal plate 12 is slidably supported on rollers 13, suitably mounted on the superstructures. These rollers may be in the form of skate wheels or the like, rotatably carried on transverse axles mounted between the pairs of angle irons 11, a sufficient number of rollers being provided both longitudinally and transversely beneath the plates, to adequately support the latter for sliding movement when loads are deposited therein.

As seen in Figure 3, the plates 12 are urged inwardly to their normal weight-receiving positions, by suitable coil springs 14, each secured at one end to one of the box channels 10 and at its other end to the respective plate 12. The converging movement of the plates 12 under the action of their springs 14, is limited by stops 15 which may comprise abutments welded to the frames 9 or angle irons 11 and extending vertically above the plates 12, in line for engagement by cross bars 16 welded adjacent the lower or outer edge of each plate 12. These stops are so arranged as to restrain further movement of the plates after their adjacent edges have converged to within a clearance distance of approximately 1 inch from one another, as shown in dotted lines in Figures 1 and 2.

In order to provide retaining means for the bales, should they tend to lean when deposited on the plates 12, an upright pipe railing 17 may be welded to each of the frames 9 around two sides of each plate. These railings are of course, open on the delivery side of the assembly so as to afford access by the lift truck in depositing bales on the platforms.

On the delivery side of the structure, a horizontal bumper 18 is provided to prevent the lift trucks from hitting the scales. Any suitable elevated abutment may be employed for this purpose.

In the use of my improved dual scales, a lift truck 19 as shown diagrammatically in Figure 4, grasps two bales of cotton 20 and 21 between its clamps 22 and deposits them simultaneously on the plates 12 of scale platforms 5 and 6. The bales are presented to the oppositely inclined plates so that when the clamps 22 are released, the bale 20 tilts to the left as shown in full lines in Figure 3, while the bale 21 tilts to the right. As the lift truck is withdrawn, the weight of the bales causes the supporting plates 12 to slide downwardly in oppoiste direction on rollers 13, against the tension of their springs 14, to positions shown in full lines, so that the bales separate and may be weighed individually without interference. The weigher at table 8 observes and records the weights of the respective bales as indicated on dials 5a and 6a and thereafter, the lift truck returns to again grasp the two bales and transfers them from the scales to the next operation in the warehouse procedure. Upon removal of the bales, the plates 12 are returned to their normal positions by springs 14 and are ready to receive the next two bales to be weighed.

It will thus be seen that with the use of my improved scale assembly, the weighing operation is greatly simplified and a considerable saving in both manpower and motion is effected. The use of the conventional hand trucks to move the individual bales on and off of the scales in completely eliminated and the operator of the lift truck depositing and removing two bales at a time from the scale assembly, together with the weigher, being all that are required.

From the foregoing it is believed that my invention may be readily understood by those skilled in the art without further description, it being borne in mind that numerous changes may be made in the details disclosed without departing from the spirit of the invention as set forth in the following claims.

I claim:

1. A dual load weighing assembly comprising two independent scale mechanisms mounted side by side on a common foundation, each including a main weighing platform and associated indicating dial, said main platforms lying in a common plane with an operating clearance space between them, to respectively weigh simultaneously presented loads, auxiliary load receiving platforms superimposed on respective main platforms, means on respective main platforms movably supporting said auxiliary platforms for relative lateral displacement in diverging directions, means normally urging respective auxiliary platforms to converge, and stop means limiting the converging movement of said auxiliary platforms to maintain a clearance between their adjacent edges.

2. A dual load weighing assembly comprising two independent scale mechanisms mounted side by side on a common foundation, each including a main weighing platform and associated indicated dial, said main platforms lying in a common plane with an operating clearance between them, to respectively weigh simultaneously presented loads, the dials of respective scales being arranged side by side and set at an angle for direct visibility from a common observation point, oppositely inclined frames fixed on the upper faces of respective main platforms, with their adjacent ends elevated, correspondingly inclined auxiliary load receiving platforms movably supported on respective frames for relative lateral displacement thereon in diverging directions, under the influence of the weight of loads respectively deposited thereon, means normally urging respective auxiliary platforms to converge at their elevated ends, and stop means limiting the converging movement of said auxiliary platforms to maintain a clearance between their elevated ends.

3. A dual load weighing assembly comprising two independent scale mechanisms mounted side by side on a common foundation, each including a main weighing platform and associated indicating dial, said main platforms lying in a common plane with an operating clearance space between them, to respectively weigh simultaneously presented loads, frames fixed to the upper faces of respective main platforms with their adjacent edges in elevated position to provide oppositely inclined supports, anti-friction means on said frames, auxiliary load receiving platforms freely supported on said anti-friction means for relative lateral displacement in diverging directions, under the influence of the weight of loads respectively deposited thereon, means normally urging respective auxiliary platforms to converge, and stop means limiting the converging movement of said auxiliary platforms to maintain a clearance between their adjacent edges.

4. A dual load weighing assembly as claimed in claim 3, wherein said anti-friction means comprises a series of rollers mounted on axes transverse to the planes of inclination of said frames and auxiliary platforms.

5. A dual load weighing assembly as claimed in claim 3, including guard railings to intercept a tilting bale located on said auxiliary platforms.

References Cited in the file of this patent

UNITED STATES PATENTS

| | | |
|---|---|---|
| 227,969 | Fairbanks | May 25, 1880 |
| 413,572 | Steedman et al. | Oct. 22, 1889 |
| 515,753 | Digeon | Mar. 6, 1894 |
| 1,163,678 | Messiter | Dec. 14, 1915 |
| 1,250,750 | Youngstrom | Dec. 18, 1917 |
| 1,626,963 | Osgood et al. | May 3, 1927 |
| 2,261,655 | Lowe | Nov. 4, 1941 |